(12) United States Patent
Kurihara et al.

(10) Patent No.: US 10,418,650 B2
(45) Date of Patent: Sep. 17, 2019

(54) PROTECTION OF SEALING OF SEPARATOR FOR FUEL CELL

(71) Applicant: TOYOTA JIDOSHA KABUSHIKI KAISHA, Toyota-shi, Aichi-ken (JP)

(72) Inventors: Takuya Kurihara, Miyoshi (JP); Kenji Sato, Kasugai (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 207 days.

(21) Appl. No.: 14/787,085

(22) PCT Filed: Oct. 17, 2014

(86) PCT No.: PCT/JP2014/005273
§ 371 (c)(1),
(2) Date: Oct. 26, 2015

(87) PCT Pub. No.: WO2015/072082
PCT Pub. Date: May 21, 2015

(65) Prior Publication Data
US 2016/0248106 A1    Aug. 25, 2016

(30) Foreign Application Priority Data
Nov. 15, 2013 (JP) .................. 2013-236543

(51) Int. Cl.
*H01M 8/02* (2016.01)
*H01M 8/10* (2016.01)
(Continued)

(52) U.S. Cl.
CPC ..... *H01M 8/0271* (2013.01); *B29C 45/14467* (2013.01); *H01M 8/0267* (2013.01);
(Continued)

(58) Field of Classification Search
CPC ............. H01M 8/0271; H01M 8/0267; H01M 8/0273; H01M 8/0276; H01M 8/0286; H01M 8/1004
See application file for complete search history.

(56) References Cited

U.S. PATENT DOCUMENTS

2008/0166622 A1*  7/2008  Shizuku ............. H01M 8/0254
                                                        429/444
2009/0280391 A1* 11/2009  Chang ................ H01M 8/0247
                                                        429/515

FOREIGN PATENT DOCUMENTS

JP        2012-89387        5/2012

* cited by examiner

*Primary Examiner* — Ula C Ruddock
*Assistant Examiner* — Frank A Chernow
(74) *Attorney, Agent, or Firm* — Dickinson Wright, PLLC

(57) ABSTRACT

An object is to improve the durability of a seal member such as a gasket. A bottom 23 is a seal surface that comes into contact with a gasket 40 placed between the bottom 23 and an adjacent cell. A cooling water manifold 411 is a flow path for cooling water that is formed to pass through a separator for fuel cell in its thickness direction. A flange 24 is protruded from one surface of a first separator in the thickness direction to surround part of the cooling water manifold 411. An area between respective ends T1 and T2 of the flange 24 is an opening K that forms a flow path in an in-plane direction of the first separator. An inclined surface 22 located on a limit line RL of the flange 24 is formed to face the gasket 40, in order to limit the move of the gasket 40 in an adjacent cell. At the end T1 located on the limit line RL, a surface opposed to the gasket 40 is covered by a protective film 70 for protecting the gasket.

5 Claims, 7 Drawing Sheets

(51) Int. Cl.
*H01M 8/0271* (2016.01)
*H01M 8/0273* (2016.01)
*H01M 8/0276* (2016.01)
*B29C 45/14* (2006.01)
*H01M 8/0267* (2016.01)
*H01M 8/0286* (2016.01)
*H01M 8/1004* (2016.01)
B29L 31/34 (2006.01)
H01M 8/1018 (2016.01)

(52) U.S. Cl.
CPC ....... *H01M 8/0273* (2013.01); *H01M 8/0276* (2013.01); *H01M 8/0286* (2013.01); *H01M 8/1004* (2013.01); B29L 2031/3468 (2013.01); H01M 2008/1095 (2013.01); Y02P 70/56 (2015.11)

PROTECTION OF SEALING OF SEPARATOR FOR FUEL CELL

CROSS-REFERENCE TO RELATED APPLICATIONS

This application is a national phase application of International Application No. PCT/JP2014/005273, filed Oct. 17, 2014, and claims the priority of Japanese Application No. 2013-236543, filed Nov. 15, 2013, the content of both of which is incorporated herein by reference.

TECHNICAL FIELD

The present invention relates to sealing in a fuel cell.

BACKGROUND ART

In a known configuration of fuel cells, a gasket for sealing between adjacent fuel cells is placed in a recess formed in a separator to maintain a compression ratio of the gasket. The recess for placing the gasket therein is formed by using a flange provided by protruding the periphery of a manifold open in the separator (for example, Patent Literature 1).

CITATION LIST

Patent Literature

PTL 1: JP 2012-89387A

SUMMARY

Technical Problem

In the configuration of using the flange provided by protruding the periphery of the manifold to form the recess for placing the gasket therein, the flange cannot be formed in a region for introducing a fluid into the plane of the fuel cell. The flange is accordingly not continuous to have flange ends. In a fuel cell stack formed by staking fuel cells using such separators, when a fuel cell is shifted by an external force, the gasket may interfere with the flange end and may be damaged.

An object is to improve the durability of a seal member by taking into account such circumstances.

Solution to Problem

In order to solve the problem described above, the invention may be implemented by the following aspects.

(1) According to one aspect, there is provided a separator for fuel cell that is used for a fuel cell and is placed to face a membrane electrode assembly. This separator for fuel cell comprises a separator center area opposed to a power generation area of the membrane electrode assembly; an outer peripheral area extended outward from the separator center area; a first manifold hole and a second manifold hole provided in the outer peripheral area; a fluid flow path formed from the first manifold hole through the separator center area toward the second manifold hole; a gasket placed around an outer circumference of the fluid flow path and the first manifold hole and second manifold hole; and a flange formed by protruding part of an area surrounding each of the first manifold hole and the second manifold hole in a thickness direction of the separator to be extended along an outer periphery of the first manifold hole or the second manifold hole. A protective film is provided in a part opposed to the gasket at an end of the flange in a manifold outer circumferential direction. This aspect improves the durability of the seal member. Covering the end of the flange in the manifold outer circumferential direction with the protective film suppresses the seal member from being damaged even when the seal member interferes with the end.

(2) According to another aspect, there is provided a fuel cell that comprises the separator for fuel cell of the above aspect as a first separator. This fuel cell further comprises a second separator arranged such that the membrane electrode assembly is placed between the first separator and the second separator; and an adhesive member provided to bond the first separator and the second separator to each other. The protective film is made of a material that is identical with material of the adhesive member. This aspect does not increase the number of materials required by addition of the protective film, thus facilitating manufacture.

(3) According to another aspect, there is provided a manufacturing method of the fuel cell of the above aspect. This manufacturing method comprises forming the protective film in an adhesion process of bonding the first separator and the second separator to each other by the adhesive member. This aspect forms the protective film simultaneously with bonding, thus facilitating manufacture.

(4) In the manufacturing method of the above aspect, the adhesion process may comprise forming the adhesive member by injection molding between the first separator and the second separator, and the protective film may be made of a material flowed in between the first separator and a mold used for the injection molding. This aspect does not need to provide a separate mold for forming the protective film, thus facilitating manufacture.

The invention may be implemented by any of various aspects other than those described above, for example, a fuel cell stack including a plurality of the above fuel cells or a fuel cell system including this fuel cell stack.

DESCRIPTION OF EMBODIMENTS

Figure 1:
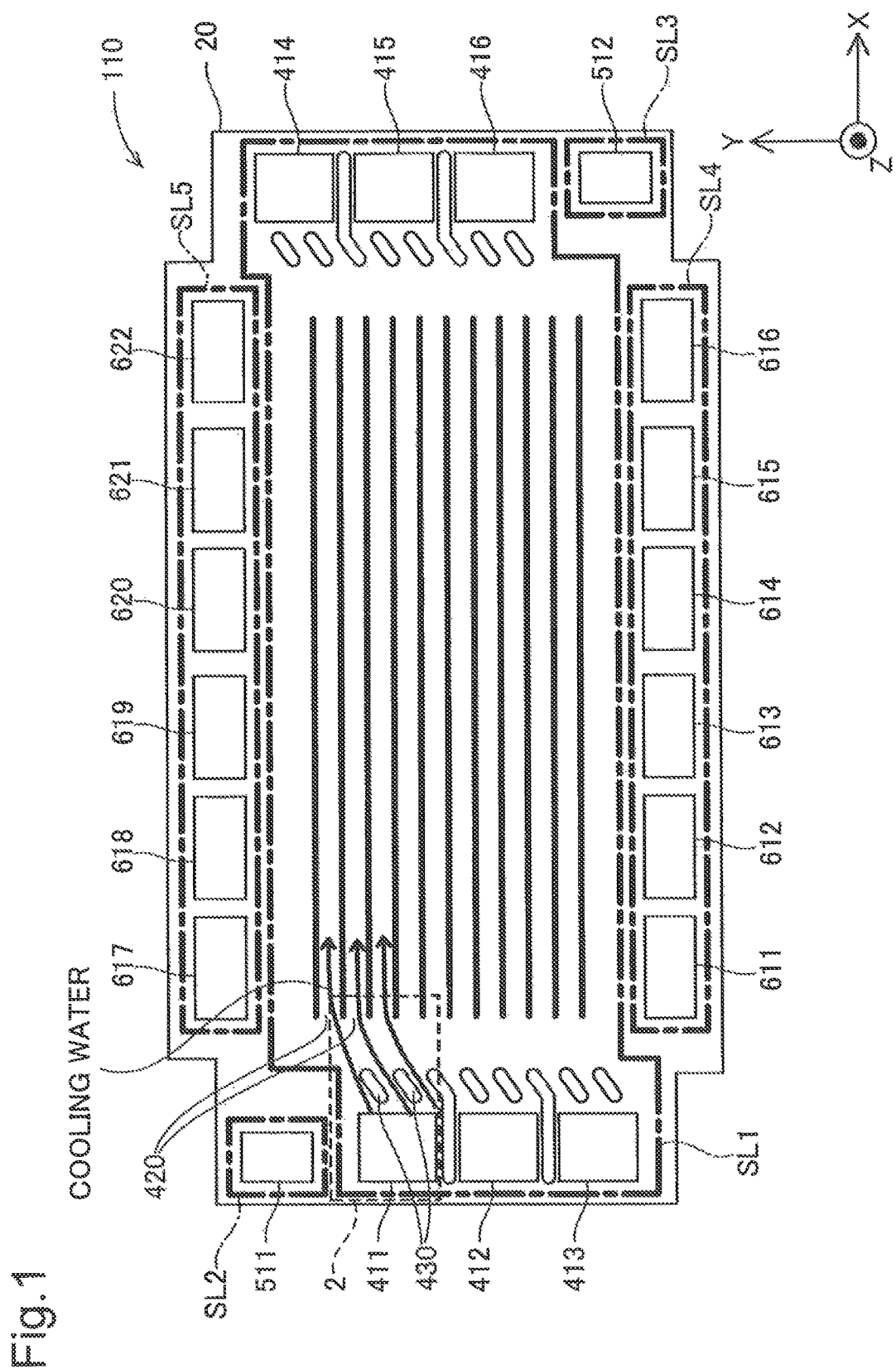
FIG. 1 is a plan view illustrating a cell.

FIG. 1 is a plan view illustrating a cell 110. A fuel cell stack is formed by stacking and fixing a plurality of the cells 110 in a Z direction shown in FIG. 1. The cell 110 has stack structure of a first separator 20, a membrane electrode assembly 10 and a second separator 30 (described later with reference to FIG. 3). The first separator 20 is seen in FIG. 1.

The cell 110 includes cooling water manifolds 411 to 416, fuel gas manifolds 511 and 512 and air manifolds 611 to 622. The cooling water manifolds 411 to 413, the fuel gas manifold 511 and the air manifolds 611 to 616 are for supply, whereas the cooling water manifolds 414 to 416, the fuel gas manifold 512 and the air manifolds 617 to 622 are for discharge.

As shown in FIG. 1, cooling water flow paths 420 are formed in the first separator 20. The flow of cooling water supplied from the cooling water manifolds 411 to 413 is regulated by ribs 430, flows through the cooling water flow paths 420 and is discharged from the cooling water manifolds 414 to 416.

FIG. 1 also shows seal lines SL1 to SL 5 on the first separator 20. The seal lines SL1 to SL5 are respectively virtual lines of closed curves representing boundaries for sealing the respective flow paths, in order to prevent the cooling water, the fuel gas and the air from being mixed with one another. The curve herein is not limited to a differentiable curve but may include a non-differentiable part, like the seal lines SL1 to SL5.

Figure 2:
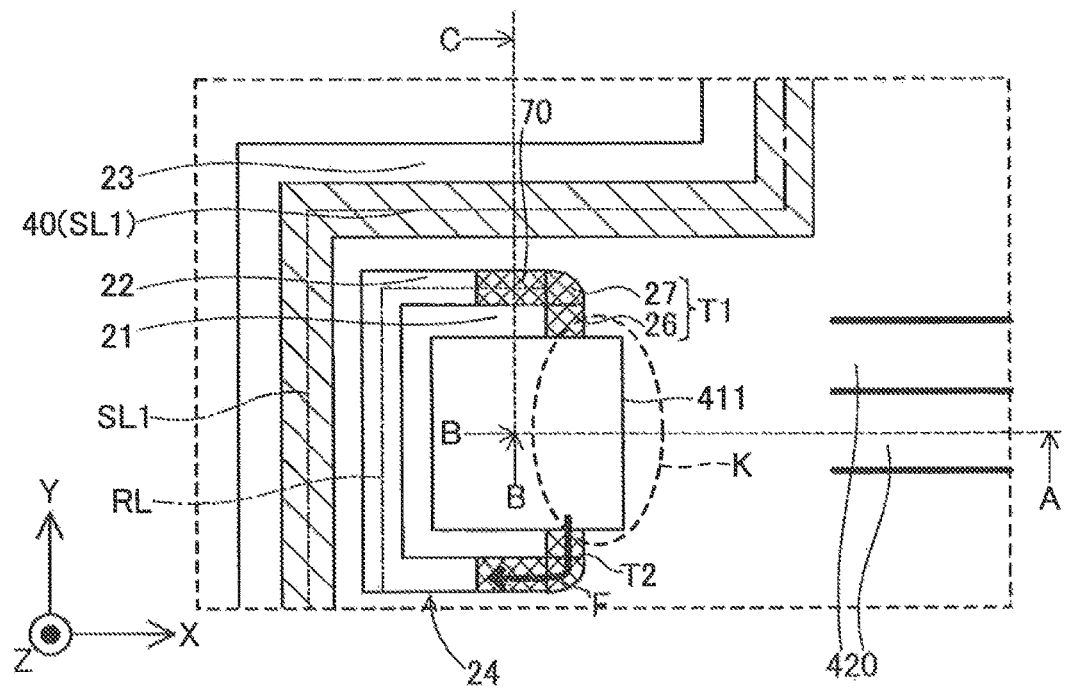
FIG. 2 is an enlarged view illustrating vicinity of a cooling water manifold.
Figure 3:
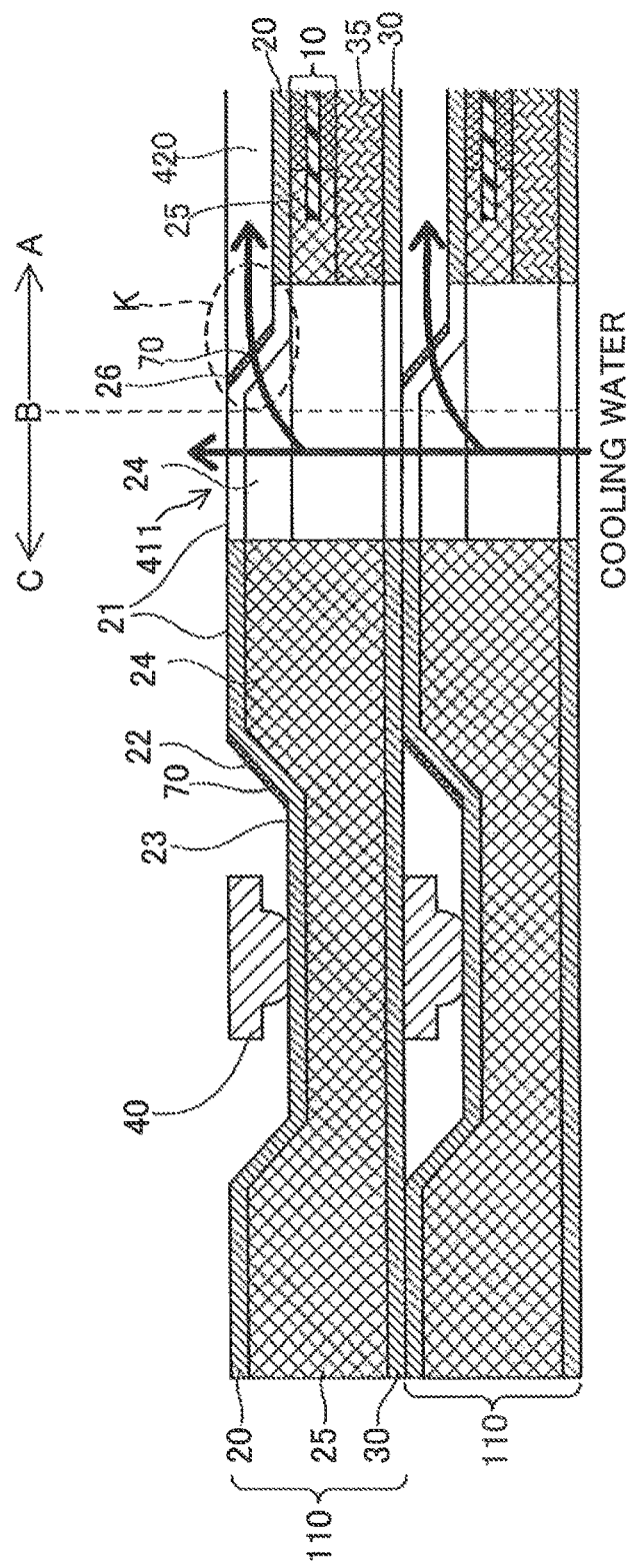
FIG. 3 is a sectional view illustrating the vicinity of the cooling water manifold.

FIG. 2 is an enlarged view illustrating an area 2 (vicinity of the cooling water manifold 411) in FIG. 1. The ribs 430 are, however, omitted from the illustration of FIG. 2. FIG. 3 shows A-B-C sections in FIG. 2, with regard to two stacked cells 110.

As shown in FIG. 3, the membrane electrode assembly 10 and a porous flow path 35 are placed between the first separator 20 and the second separator 30 on the right side of the A-B section (center area of the cell 110). The porous flow path 35 is made of a porous material having gas diffusivity and electrical conductivity such as a porous metal (for example, expanded metal). The porous flow path 35 has a high porosity and accordingly serves as a flow path which a reactive gas flows through. A seal adhesive member 25 is placed between the first separator 20 and the second separator 30 in an outer peripheral area where the respective manifolds described above are placed.

The seal adhesive member 25 serves to bond the first separator 20 to the second separator 30 and seal the respective manifolds from the atmosphere. Sealing described above with reference to FIG. 1 is provided by a gasket 40 shown in FIGS. 2 and 3. The gasket 40 is made of a material having gas impermeability, elasticity and heat resistance. The available material is specifically a rubber or an elastomer and is more specifically, any of silicone rubber, butyl rubber, acrylic rubber, natural rubber, fluorine rubber, ethylene-propylene rubber, styrene elastomer and fluorine elastomer. Other materials may also be employed appropriately.

As shown in FIGS. 2 and 3, the gasket 40 is placed on a bottom 23. The gasket 40 of this embodiment is bonded to the second separator 30 as described later, while being in contact with the first separator 20 but not being bonded to the first separator 20. For convenience of illustration, however, the gasket 40 that is in contact with the first separator 20 is shown in FIGS. 2 and 3.

The bottom 23 is a recessed area of the first separator 20 in the Z direction as shown in FIG. 3. Placing the gasket 40 in the recessed area of the first separator 20 determines the position of the gasket 40 (distance in height between the bottom 23 and a contact surface 21). This provides the gaskets 40 placed between respective adjacent cells with a uniform compression ratio and improves the sealing performance of the entire fuel cell. As shown in FIG. 3, an inclined surface 22 is a plane that obliquely connects the bottom 23 with the contact surface 21. The inclined surface 22 may be replaced with a vertical plane formed perpendicular to both the bottom 23 and the contact surface 21.

As shown in FIG. 3, the contact surface 21 is a region that is in contact with an adjacent cell 110. The contact surface 21 and the inclined surface 22 are part of a flange 24 described below. The flange 24 is a convex protruded in the thickness direction of the cell 110 to form the cooling water manifold 411.

The inclined surface 22 is placed to face the gasket 40 and thereby serves to limit the move of the gasket 40 in an XY plane. For example, when the gasket 40 moves on the XY plane due to, for example, an external force-induced shift of one of the stacked cells in the fuel cell, the gasket 40 comes into contact with the inclined surface 22 to stop further moving. This function is achieved by part of the inclined surface 22. This part denotes a portion placed along one of the seal lines SL1 to SL5. In the area illustrated in FIG. 2, this part corresponds to the inclined surface 22 located on a limit line RL. The limit line RL is a curve along part of the seal line SL1 as shown in FIG. 2.

The flange 24 is formed to surround part of the cooling water manifold 411 as shown in FIG. 2. The flange 24 is formed to surround not the entire outer circumference but part of the outer circumference of the cooling water manifold 411, because of a need for an inlet of cooling water in a cell in-plane direction. According to this embodiment, the cooling water flows in approximately a positive X direction, so that an opening K is formed as the inlet of cooling water in this direction. The opening K denotes a region where the flange 24 is not formed.

Forming the opening K provides the flange 24 with two ends T1 and T2. The end T1 is an end that is located on the limit line RL, whereas the end T2 is an end that is not located on the limit line RL.

Each of the ends T1 and T2 includes connection surfaces 26 and 27. The connection surface 26 is arranged to connect the contact surface 21 with the bottom 23, and the connection surface 27 is a curved surface arranged to connect the contact surface 21 and the inclined surface 22 with the connection surface 26. The respective ends T1 and T2 may also be regarded as parts of the opening K.

As shown in FIG. 2 and FIG. 3, a protective film 70 is formed to cover part of the inclined surface 22 and the ends T1 and T2. Part of the inclined surface 22 covered by the protective film 70 is regions in the vicinity of the ends T1 and T2.

This embodiment employs a manufacturing process described later, so that the material of the protective film 70 is identical with the material of the seal adhesive member 25. According to this embodiment, the material of the seal adhesive member 25 and the protective film 70 is the same as the material of the gasket 40.

Covering the vicinity of the end T1 that is the end located on the limit line RL with the protective film 70 suppresses the gasket 40 from being damaged. This is because, even when the gasket 40 is moved by an external force to come into contact with the vicinity of the end T1 or more specifically a boundary between the inclined surface 22 and the connection surface 27, the boundary is covered by the protective film 70 of an elastic material.

The above description with reference to FIGS. 2 and 3 is related to the cooling water manifold 411 but is similarly applicable to all the other cooling water manifolds. Like the cooling water manifold 411, with respect to the cooling water manifolds 413, 414 and 416, the end T1 is likely to come into contact with the gasket 40. With respect to the cooling water manifold 412, when the flange 24 is formed, for example, by only regions parallel to the adjacent gasket 40, both ends of the flange 24 may come into contact with the gasket 40.

Figure 4:
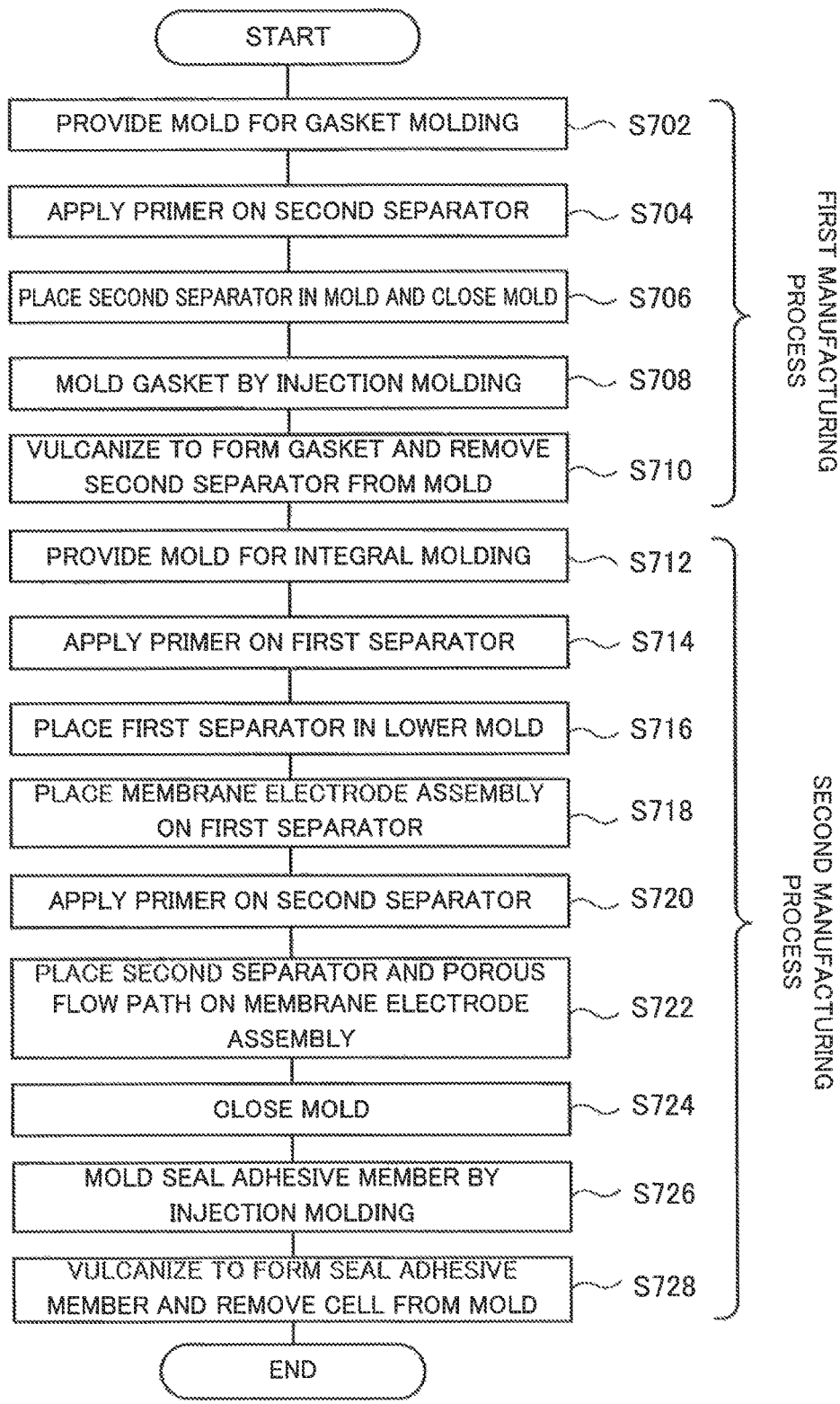
FIG. 4 is a flow chart showing a manufacturing method of the cell.

FIG. 4 is a flowchart showing a manufacturing method of the cell 110. The manufacturing method of the cell 110 is roughly divided into a first manufacturing process (steps S702 to S710) and a second manufacturing process (step S712 to S728). The first manufacturing process is a process of forming the gasket 40 on the second separator 30. The second manufacturing process is a process of bonding the first separator 20 to the second separator 30 with the gasket 40 formed thereon to form the cell 110.

Figure 5:
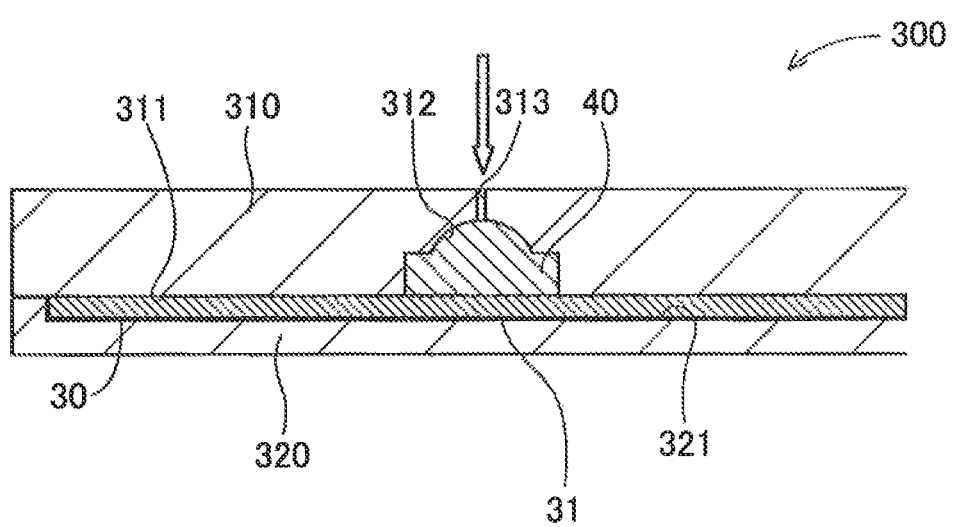
FIG. 5 is a diagram illustrating a first manufacturing process.

FIG. 5 is a diagram illustrating the first manufacturing process. The process first provides a mold 300 for molding the gasket 40 (step S702). The mold 300 consists of an upper mold 310 and a lower mold 320 as shown in FIG. 5.

The upper mold 310 includes a flat mold plane 311, a gasket forming structure 312 and an injection hole 313. The flat mold plane 311 is a plane that comes into contact with an outer surface of the second separator 30. The gasket forming structure 312 is a recess for forming the gasket 40 on the second separator 30. The injection hole 313 is a flow path for injecting a material for forming the gasket 40 onto the second separator 30. The lower mold 320 includes a flat mold plane 321. The flat mold plane 321 is a plane that comes into contact with an inner surface of the second separator 30.

The process subsequently applies a primer in a region where the gasket 40 is to be formed, on the outer surface of the second separator 30 (step S704). The primer is applied to form an adhesive layer of the gasket 40 on the second separator 30. According to this embodiment, an adhesive is used as the primer.

The process then places the second separator 30 in the mold 300 and closes the mold 300 (step S706). A specific procedure places the second separator 30 relative to the flat mold plane 321 of the lower mold 320 such that the flat mold plane 321 faces the inner surface of the second separator 30, and subsequently closes the upper mold 310 relative to the lower mold 320.

The process subsequently injects a material for forming the unvulcanized gasket 40 from the injection hole 313 of the upper mold 310 to mold the gasket 40 by injection molding (step S708). According to this embodiment, "material for forming the unvulcanized gasket 40" denotes a mixture of sulfur with an elastic material such as a rubber or an elastomer as the base of the gasket 40, for example, a liquid rubber or a solid rubber mixed with a vulcanizing agent.

The process then performs vulcanizing treatment (heating) to form the gasket 40 and opens the upper mold 310 relative to the lower mold 320 to remove the second separator 30 from the mold (step S710). This series of first manufacturing process produces the second separator 30 having the gasket 40 formed on a flat plane 31.

Figure 6:
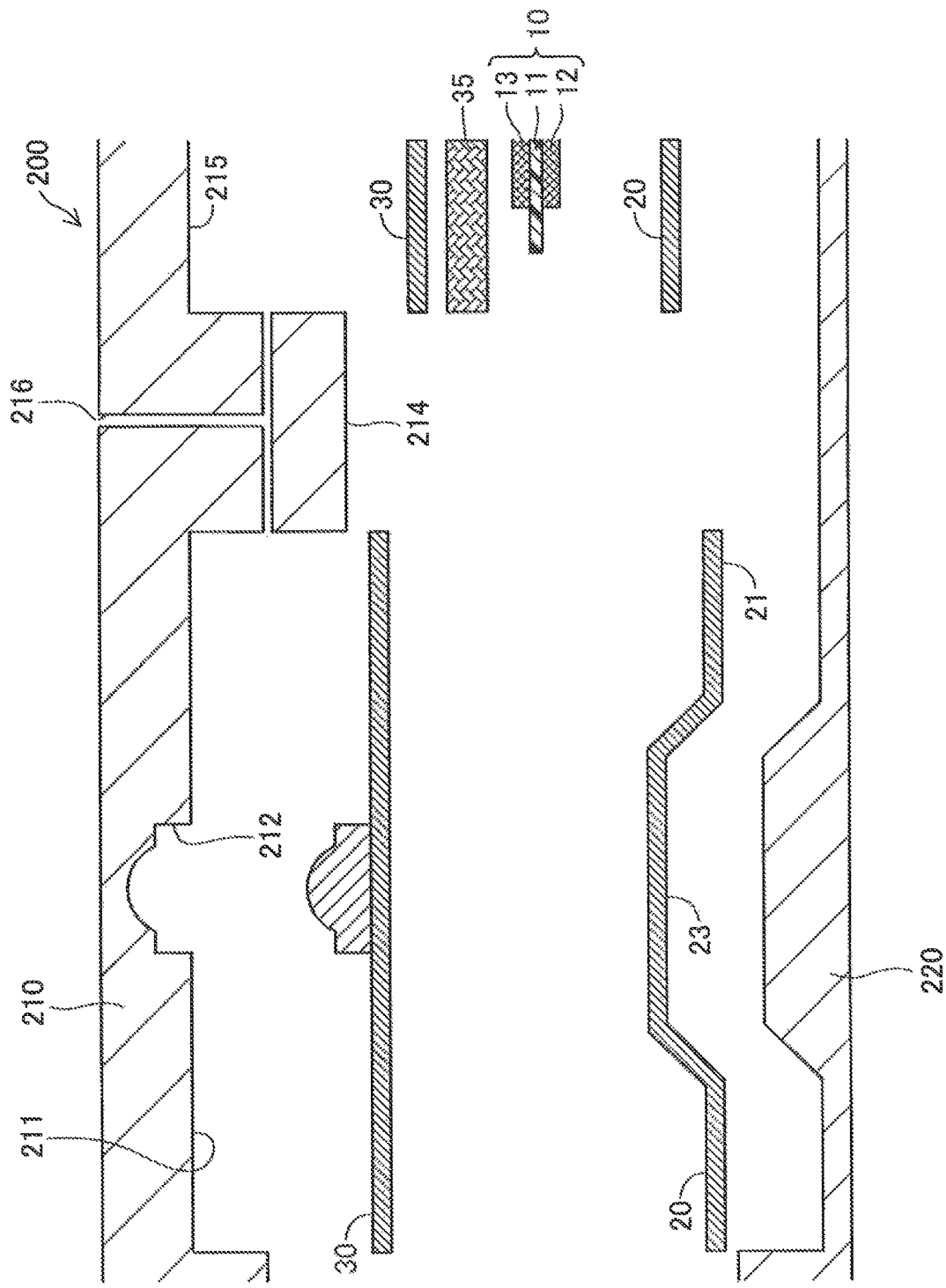
FIG. 6 is a diagram illustrating a second manufacturing process.

FIG. 6 is a diagram illustrating the second manufacturing process. The process first provides a mold 200 for integral molding (step S712). As shown in FIG. 6, the mold 200 consists of an upper mold 210 and a lower mold 220.

The upper mold 210 includes a first flat mold plane 211, a gasket receiving structure 212, a manifold forming structure 214, a second flat mold plane 215 and an injection hole 216.

The first flat mold plane 211 is a plane that comes into contact with the outer surface of the second separator 30. The gasket receiving structure 212 is a recess for receiving the gasket 40 formed on the second separator 30. The manifold forming structure 214 is a convex that comes into contact with the lower mold 220 and forms the cooling water manifold 411 when the upper mold 210 is closed relative to the lower mold 220. The second flat mold plane 215 is a plane that comes into contact with the outer surface of the second separator 30. The injection hole 216 is a flow path for injecting a material for forming the seal adhesive member 25 onto the second separator 30.

After providing the mold 200, the process applies the primer on an inner surface of the first separator 20 (step S714). After applying the primer, the process places the first separator 20 relative to the lower mold 220 (step S716). The process then places the membrane electrode assembly 10 relative to the placed first separator 20 (step S718).

The process subsequently applies the primer on the inner surface of the second separator 30 (opposite surface that is opposite to the surface where the gasket 40 is formed) (step S720).

The process then places the second separator 30 relative to the placed membrane electrode assembly 10 such that the membrane electrode assembly 10 faces the inner surface of the second separator 30 and places the porous flow path 35 between the membrane electrode assembly 10 and the second separator 30 (step S722).

The process subsequently closes the upper mold 210 relative to the lower mold 220 (step S724). In the course of closing the mold, the gasket 40 formed on the second separator 30 is received in the gasket receiving structure 212 of the upper mold 210.

The process then injects a material for forming the unvulcanized seal adhesive member 25 from the injection hole 216 of the upper mold 210 to mold the seal adhesive member 25 by injection molding (step S726).

The process subsequently performs vulcanizing treatment to form the seal adhesive member 25 and opens the upper mold 210 relative to the lower mold 220 to remove the cell 110 from the mold (step S728). This series of second manufacturing process produces the cell 110.

Figure 7:
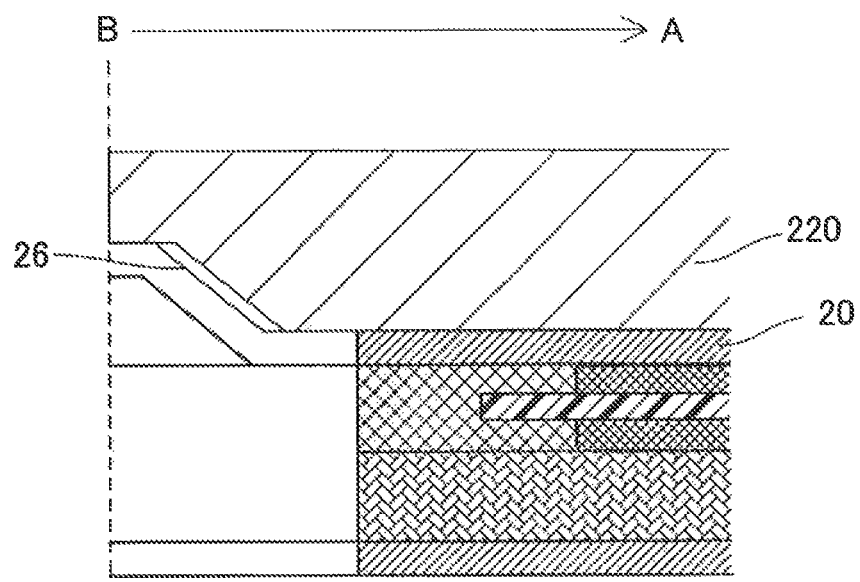
FIG. 7 is a diagram illustrating formation of a protective film.

FIG. 7 is a diagram illustrating formation of the protective film 70 and illustrates the lower mold 220 in addition to the enlarged view of the A-B section of FIG. 3. The protective film 70 is formed in the second manufacturing process. As shown in FIGS. 6 and 7, the lower mold 220 is covered over the first separator 20 to prevent the material for the seal adhesive member 25 from flowing into a clearance between the first separator 20 and the lower mold 220.

According to this embodiment, however, the dimension design is determined such as to form a small clearance between the inclined surface 22 and the lower mold 220. The material for the seal adhesive member 25 is then flowed into this clearance, so that the protective film 70 is molded by injection molding. Such inflow is shown by an arrow F in FIG. 2. An arrow showing the flow into the end T1 is omitted for convenience of illustration. The inflow direction corresponds to a direction from the front to the back of the sheet surface in FIG. 7. This clearance is small, so that the inflow area of the material is limited to the vicinities of the ends T1 and T2. Accordingly the protective film 70 is formed in the vicinities of the ends T1 and T2.

An actual product has dimensional tolerance, so that it is difficult to completely prevent the material from flowing into the clearance between the first separator 20 and the lower mold 220. The inflow of the material for forming the protective film 70 may be regarded as the technique taking advantage of this phenomenon.

Additionally, providing the clearance between the inclined surface 22 and the lower mold 220 prevents interference of the inclined surface 22 with the lower mold 220 and reduces failure in placing the first separator 20 relative to the lower mold 220, thus reducing failure in manufacture.

The manufacturing method described above also forms the protective film 70 at the ends T2 of the cooling water manifolds 411, 413, 414 and 416 and the ends T1 and T2 of the cooling water manifolds 412 and 415.

The invention is not limited to any of the embodiment, the examples and the modifications described above but may be implemented by a diversity of other configurations without departing from the scope of the invention. For example, the technical features of the embodiment, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein. Some examples of possible modification are given below.

The protective film may be formed in a different process from injection molding of the seal adhesive member. For example, the protective film may be formed by application or may be formed by injection molding using a separate mold.

The material of the protective film may be different from the materials of the seal adhesive member and the gasket. For the purpose of protection of the gasket, however, a soft material is preferable. The gasket may be protected by taking advantage of elasticity like the above embodiment or may be protected by taking advantage of plastic deformation (for example, viscosity).

The gasket may be vulcanized simultaneously with vulcanization of the seal adhesive member or may be vulcanized after vulcanization of the seal adhesive member.

The region where the protective film is formed is not limited to the vicinity of the end of the inclined surface but may include an area away from the end of the inclined surface or may be even the entire area of the inclined surface.

The protective film may not be formed at an end that is unlikely to interfere with the gasket (for example, at the end T2 described in the above embodiment or at ends of the cooling water manifolds 412 and 415).

The porous flow path may be omitted. In this case, a groove flow path may be formed in the second separator.

REFERENCE SIGNS LIST 10 membrane electrode assembly
20 first separator
21 contact surface
22 inclined surface
23 bottom
24 flange
25 seal adhesive member
26 connection surface
27 connection surface
30 second separator
31 flat plane
35 porous flow path
40 gasket
70 protective film
110 cell
200 mold
210 upper mold
211 first flat mold plane
212 gasket receiving structure
214 manifold forming structure
215 second flat mold plane
216 injection hole
220 lower mold
221 flat mold plane
300 mold
310 upper mold
311 flat mold plane
312 gasket forming structure
313 injection hole
320 lower mold
321 flat mold plane
411-416 cooling water manifolds
420 cooling water flow paths
430 ribs
511, 512 fuel gas manifolds
611-617 air manifolds
K opening
T1, T2 ends
RL limit line
SL1-SL6 seal lines

The invention claimed is:

1. A separator for fuel cell that is used for a fuel cell and is placed to face a membrane electrode assembly, the separator comprising:
    a separator center area opposed to a power generation area of the membrane electrode assembly;
    an outer peripheral area extended outward from the separator center area;
    a first manifold hole and a second manifold hole provided in the outer peripheral area;
    a fluid flow path formed from the first manifold hole through the separator center area toward the second manifold hole;
    a gasket placed around an outer circumference of the fluid flow path, the first manifold hole and the second manifold hole; and
    a protrusion formed in the separator protruding in a thickness direction of the separator away from the membrane electrode assembly, the protrusions being formed in an area surrounding each of the first manifold hole and the second manifold hole, wherein the protrusions to not completely surround the first manifold hole and the second manifold hole such that the area surrounding the first manifold hole and the second manifold hole where protrusions are not present form part of the fluid flow path, wherein
    a protective film is provided on a part of the protrusion facing the gasket.

2. A fuel cell that comprises the separator for fuel cell according to claim 1 as a first separator,
    the fuel cell further comprising:
    a second separator arranged such that the membrane electrode assembly is placed between the first separator and the second separator; and
    an adhesive member provided to bond the first separator and the second separator to each other, wherein
    the protective film is made of a material that is identical with material of the adhesive member.

3. A manufacturing method of the fuel cell according to claim 2, the manufacturing method comprising:
    forming the protective film in an adhesion process of bonding the first separator and the second separator to each other by the adhesive member.

4. The manufacturing method according to claim 3,
    wherein the adhesion process comprises forming the adhesive member by injection molding between the first separator and the second separator, and
    the protective film is made of a material flowed in between the first separator and a mold used for the injection molding.

5. A fuel cell stack that comprises a plurality of the fuel cells according to claim 2.

\* \* \* \* \*